R. C. M. LOVELL.
Hoisting Windlasses.

No. 149,047.   Patented March 31, 1874.

Attest.
Jas. H. Layman.
Walter Allen

Richard C. M. Lovell
By Knight Bros. Att'ys.

UNITED STATES PATENT OFFICE.

RICHARD C. M. LOVELL, OF COVINGTON, KENTUCKY.

IMPROVEMENT IN HOISTING-WINDLASSES.

Specification forming part of Letters Patent No. 149,047, dated March 31, 1874; application filed September 15, 1873.

*To all whom it may concern:*

Be it known that I, RICHARD C. M. LOVELL, of Covington, county of Kenton, Kentucky, have invented a new and useful Improvement in Hoisting-Windlasses, of which the following is a specification:

My invention relates to an improved construction of hoisting drum or windlass, one portion of which has the form of a conical or conoided "fusee," the remaining portion or portions being cylindrical, or nearly so, the diameter of each cylindrical portion corresponding to that of the fusee at the end to which it is joined. These members are scored around their peripheries with spiral grooves whose convolutions on the larger cylindrical and the conical portions are in the contrary direction to those on the smaller cylindrical portion. To this differential windlass, at the point of junction of its two opposing convolutions, is securely fastened a cord, chain, or cable, which, preparatory to winding, may be directed into either the smaller cylinder or into the fusee, whence, by continued rotation, it may pass on to the larger cylindrical portion, so as to avail greater speed or greater power, as the necessities of the case may require.

Figure 1:
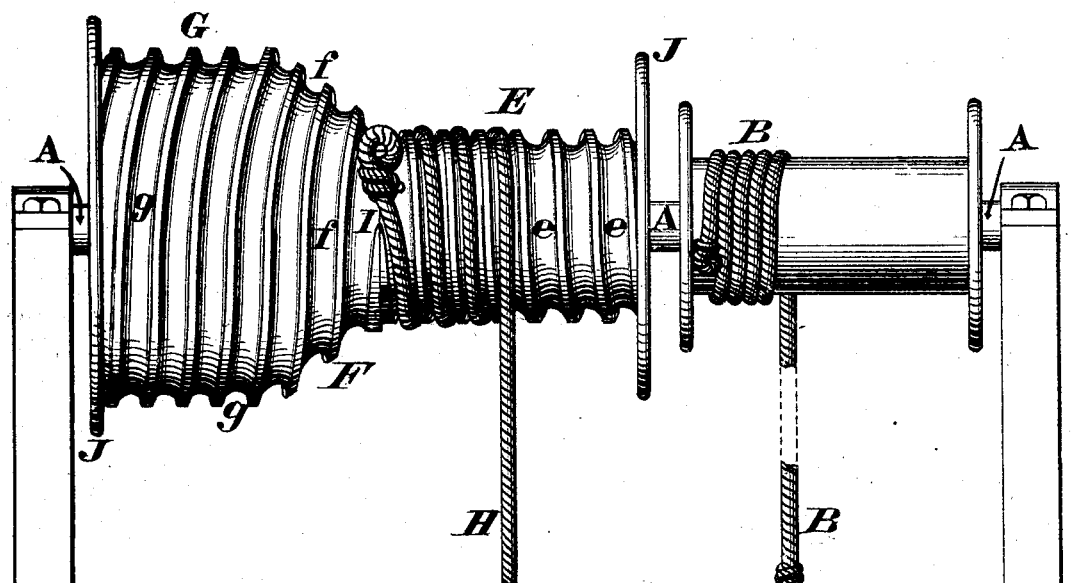
Figure 2:
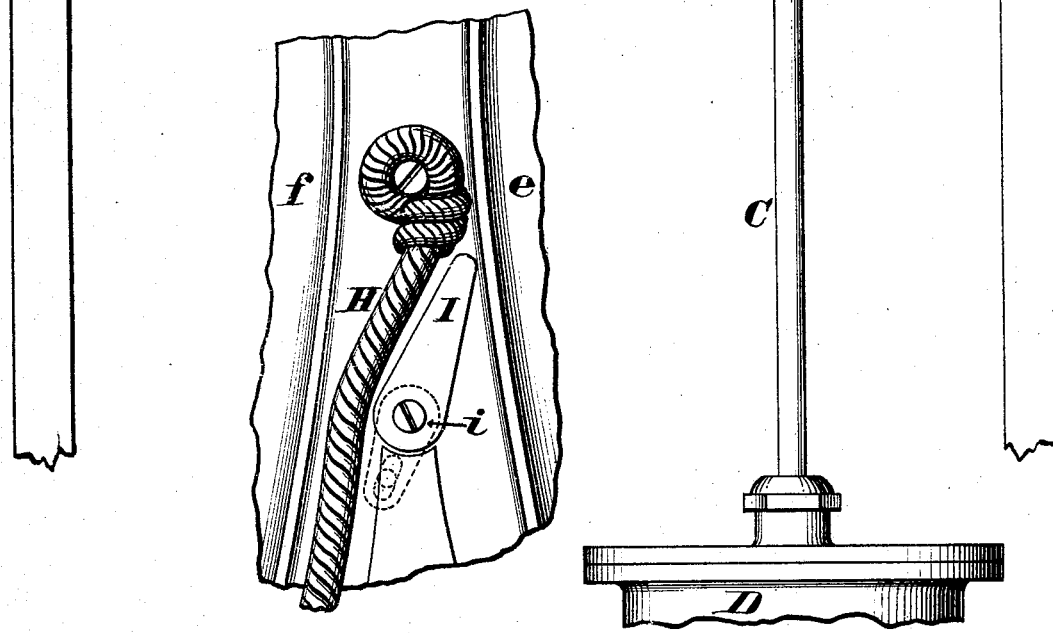

Figure 1 is a side elevation of a hoisting-windlass embodying my invention. Fig. 2 is an enlarged representation of the switch.

A represents the windlass-shaft, which may be driven by any approved instrumentality—for example, a cable, B, placed in communication with any suitable motor, such as piston C of a hydraulic cylinder, D. Firmly attached to shaft A is my differential drum or pulley, consisting of smaller cylindrical member E, having its periphery scored with left-hand grooves or convolutions $e$, which grooves merge into similar right-hand convolutions $f$ and $g$ upon the fusee or conical portion F and the larger cylindrical portion G. The cord, rope, or cable H, which transmits the power to the cage, platform, or other object to be elevated, is attached to my differential drum where the said right and left convolutions coalesce, so as to be a little in front of the frog, tongue, or point I, which frog may, if preferred, be pivoted at $i$, and be capable of being shifted either to the left, so as to "switch" or direct the cable onto the smaller cylindrical portion E, thus giving the maximum power, or of being shifted to the right, as in Fig. 2, so as to switch the cable on the fusee F, and thence onto the larger cylindrical portion G, so as to impart the maximum speed.

The frog or tongue I, when movable, may be operated through the instrumentality of any suitable shifter—such, for example, as a lever or handle communicating by mechanism passing through a bore in the drum-axis, and having interior connection with the frog-pivot or otherwise; or the said tongue may be stationary, and the cable be shifted by hand.

My differential pulley should either be prolonged sufficiently to prevent unshipping of the cable over the ends, or be furnished with flanges J for that purpose.

Should it be preferred to give the smaller member a right-hand spirality, the remaining portion will, of course, be given a left-hand one, it being only material that these two positions should have an opposite spirality.

I claim as new and of my invention—

The combination of a differential pulley or windlass-drum, E $e$ F $f$ G $g$, and tongue or frog I, to be used in connection with a cable, H, or its equivalent, substantially as and for the purpose set forth.

In testimony of which invention I hereunto set my hand.

RICHARD C. M. LOVELL.

Attest:
GEO. H. KNIGHT,
L. A. SNOWDEN.